United States Patent
Gotohda

(10) Patent No.: US 7,444,004 B2
(45) Date of Patent: Oct. 28, 2008

(54) IMAGE RECOGNITION SYSTEM, IMAGE RECOGNITION METHOD, AND MACHINE READABLE MEDIUM STORING THEREON AN IMAGE RECOGNITION PROGRAM

(75) Inventor: Yukita Gotohda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 592 days.

(21) Appl. No.: 11/090,198

(22) Filed: Mar. 28, 2005

(65) Prior Publication Data

US 2005/0226508 A1 Oct. 13, 2005

(30) Foreign Application Priority Data

Mar. 29, 2004 (JP) .............................. 2004-096852

(51) Int. Cl.
*G06K 9/00* (2006.01)
*H04N 7/00* (2006.01)

(52) U.S. Cl. ...................... 382/104; 382/190; 382/217; 348/113

(58) Field of Classification Search ................ 382/217, 382/103, 104, 190, 209; 348/113–120
See application file for complete search history.

(56) References Cited

U.S. PATENT DOCUMENTS 5,960,097 A * 9/1999 Pfeiffer et al. .............. 382/103
6,834,232 B1 * 12/2004 Malhotra .................... 701/301
2005/0102083 A1 * 5/2005 Xu et al. ...................... 701/70

FOREIGN PATENT DOCUMENTS

JP 2002-362302 A 12/2002

* cited by examiner

*Primary Examiner*—Aaron W Carter
(74) *Attorney, Agent, or Firm*—Birch, Stewart, Kolasch & Birch, LLP

(57) ABSTRACT

There is provided an image recognition system which recognizes a subject, which is moving with respect to an image capturing unit, included in an image captured by the image capturing unit, comprising: the image capturing unit; a first recognition unit which recognizes a candidate of the subject included in the image captured by the image capturing unit by comparing the image captured by the image capturing unit with predetermined template data; a template selection unit which selects the template data to be compared with an image captured by the image capturing unit after a predetermined duration has been elapsed from a time of capturing an image used for recognition of the candidate by the recognition unit; and a second recognition unit which recognizes the subject by comparing the image, which is captured by the image capturing unit after a predetermined duration has been elapsed from a time of capturing an image used for recognition of the candidate by the first recognition unit, with the template data selected by the template selection unit.

13 Claims, 6 Drawing Sheets

IMAGE RECOGNITION SYSTEM, IMAGE RECOGNITION METHOD, AND MACHINE READABLE MEDIUM STORING THEREON AN IMAGE RECOGNITION PROGRAM

This patent application claims priority from a Japanese patent application No 2004-096852 filed on Mar. 29, 2004, the contents of which are incorporated herein by reference.

BACKGROUND OF THE INVENTION

1. Field of the Invention

The present invention relates to an image recognition system, an image recognition method, and a machine readable medium storing thereon an image recognition program. More particularly, the present invention relates to an image recognition system, an image recognition method and a machine readable medium storing thereon an image recognition program which recognize an object included in a captured image.

2. Description of Related Art

Conventionally, an image recognition system is known which attempts improvement of safety of a motor driver by recognizing surrounding environment from an image captured by a camera equipped in a vehicle, such as a automobile, and by notifying the driver or the like of the recognition result. However, since the recognition processing requires great amount of time when the image recognition is performed to the whole image captured by the camera, the recognition cannot be performed very accurately.

Then, a technology which reduces the time for the recognition processing is known by performing the recognition processing only in an area recognized as a sidewalk when detecting a white line on the ground from the image captured in visible radiation region, recognizing a sidewalk area, and recognizing a subject from the image captured in infrared region (cf. Japanese Patent Laid-Open No. 2002-362302).

However, like the above-mentioned technology when performing the image recognition only in a sidewalk area, an object which the driver should pay attention the most, e.g., a person who walks in a driveway, cannot be recognized and it prevents the safety improvement of the system.

SUMMARY OF THE INVENTION

Therefore, it is an object of the present invention to provide an image recognition system, an image recognition method, and a machine readable medium storing thereon an image recognition program which can solve the foregoing problems. The above and other objects can be achieved by combinations described in the independent claims. The dependent claims define further advantageous and exemplary combinations of the present invention.

According to a first aspect of the present invention, there is provided an image recognition system which recognizes a subject, which is moving with respect to an image capturing unit, included in an image captured by the image capturing unit. The image recognition system includes: the image capturing unit; a first recognition unit which recognizes a candidate of the subject included in the image captured by the image capturing unit by comparing the image captured by the image capturing unit with predetermined template data; a template selection unit which selects the template data to be compared with an image captured by the image capturing unit after a predetermined duration has been elapsed from a time of capturing an image used for recognition of the candidate by the recognition unit; and a second recognition unit which recognizes the subject by comparing the image, which is captured by the image capturing unit after a predetermined duration has been elapsed from a time of capturing an image used for recognition of the candidate by the first recognition unit, with the template data selected by the template selection unit.

The image capturing unit may be provided in a movable body, and may capture circumference of the movable body.

The movable body may be a vehicle.

The first recognition unit may recognize the candidate of the subject when correlation of an image captured by the image capturing unit and the template data is greater than a predetermined first reference value, and the second recognition unit may recognize the subject when correlation of an image captured by the image capturing unit and the template data selected by the template selection unit is greater than the first reference value and greater than a predetermined second reference value, which is greater than the first reference value.

The first recognition unit may recognize probability of the candidate by comparing an image captured by the image capturing unit with the predetermined template data, and the template selection unit may select the template data corresponding to the candidate as the a template data to be compared with an image captured by the image capturing unit after a predetermined duration has been elapsed from a time of capturing an image used for recognition of the candidate by the first recognition unit when the probability of the candidate recognized by the first recognition unit is greater than a predetermined reference value.

The template selection unit may select the template data which is different from the template data compared with the captured data as the a template data to be compared with an image captured by the image capturing unit after a predetermined duration has been elapsed from a time of capturing an image used for recognition of the candidate by the second recognition unit when the subject could not be recognized by the second recognition unit.

The image recognition system may further includes a speed measurement unit which measures speed of the vehicle; and a region estimate unit which estimate a position of a region indicating the subject in an image captured by the image capturing unit after a predetermined duration has been elapsed after a time of capturing an image used for recognition of the candidate by the first recognition unit based on a region indicating the subject recognized by the first recognition unit in an image captured by the image capturing unit, and on the speed, wherein the second recognition unit may recognize the subject by comparing a predetermined range of image centering on a position estimated by the region estimate unit among images captured by the image capturing unit with the template data selected by the template selection unit.

The image recognition system may further include a steering angle measurement section which measures a steering angle of the vehicle, wherein the region estimate section may estimate a position of a region indicating the subject further based on the steering angle.

The region estimate section may further estimate a size of a region indicating the subject in an image captured by the image capturing unit after a predetermined duration has been elapsed after a time of capturing an image used for recognition of the candidate by the first recognition section based on a region indicating the subject recognized by the first recognition unit in an image captured by the image capturing unit, and on the speed, and the second recognition section may recognizes the subject by comparing a predetermined range of an image according to a size estimated by the region estimate section centering on a position estimated by the region estimate section among images captured by the image capturing unit with the template data selected by the template selection section.

The template data may be images, and the larger a size of a region indicating the subject estimated by the region estimate unit is, the larger size of image the template selection unit may select as the template data to be compared with an image of the region indicating the subject in an image captured by the image capturing unit after a predetermined duration has been elapsed after a time of capturing an image used for recognition of the candidate by the first recognition unit.

The image recognition system may further include a capturing control unit which controls the image capturing unit, wherein the faster the speed measured by the speed measurement unit is, the shorter a time interval for capturing an image by the image capturing unit may become.

According to a second aspect of the present invention, there is provided an image recognition method which recognizes a subject, which is moving with respect to an image capturing unit, included in an image captured by the image capturing unit. The image recognition method includes: a first image capturing step of capturing an image by the image capturing unit; a first recognition step of recognizing a candidate of the subject included in the image captured in the first image capturing step by comparing the image captured in the image capturing step with predetermined template data; a template selection step of selecting the template data to be compared with an image captured by the image capturing unit after a predetermined duration has been elapsed from a time of capturing an image in the first image capturing step; a second image capturing step of capturing an image by the image capturing unit after a predetermined duration has been elapsed from a time of capturing an image in the first image capturing step; and a second recognition step of recognizing the subject by comparing the image captured in the second image capturing unit with the template data selected in the template selection step.

According to a third aspect of the present invention, there is provided a machine readable medium having an image recognition program stored thereon, which when executed by a machine cause the machine to act as an image recognition system which recognizes a subject, which is moving with respect to an image capturing unit, included in an image captured by the image capturing unit. The image recognition system includes: the image capturing unit; a first recognition unit which recognizes a candidate of the subject included in the image captured by the image capturing unit by comparing the image captured by the image capturing unit with predetermined template data; a template selection unit which selects the template data to be compared with an image captured by the image capturing unit after a predetermined duration has been elapsed from a time of capturing an image used for recognition of the candidate by the recognition unit; and a second recognition unit which recognizes the subject by comparing the image, which is captured by the image capturing unit after a predetermined duration has been elapsed from a time of capturing an image used for recognition of the candidate by the first recognition unit, with the template data selected by the template selection unit.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
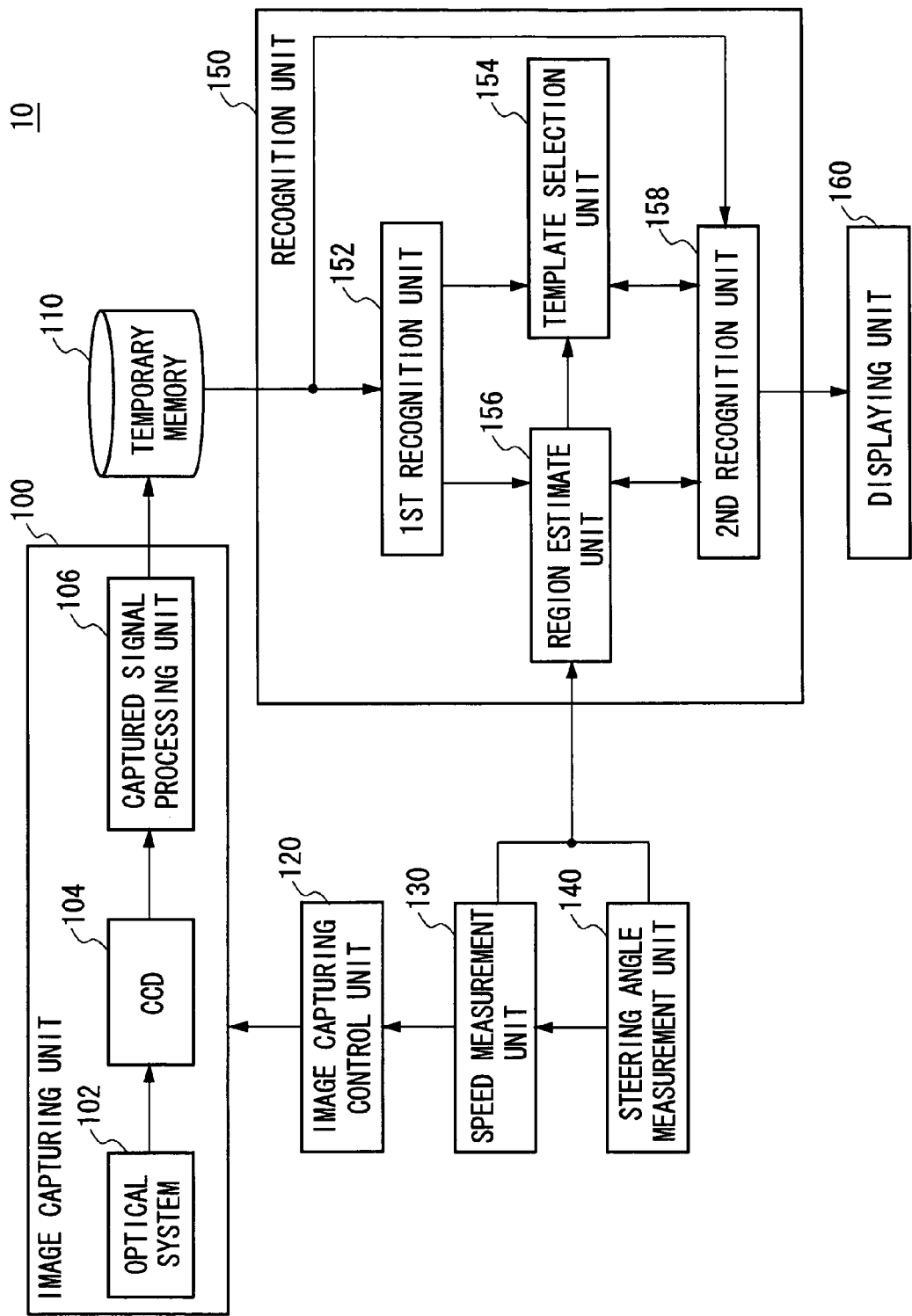
FIG. 1 is a block diagram exemplary showing a configuration of an image recognition system according to an embodiment of the present invention.

FIG. 1 is a block diagram exemplary showing a configuration of an image recognition system 10 according to an embodiment of the present invention. The image recognition system 10 is equipped in a vehicle, e.g., an automobile, and recognizes a subject included in a captured image around the vehicle. Then, when the person has been recognized near the vehicle, the image recognition system 10 contributes to safety driving by alerting the driver to the situation, and/or assisting automatic operation of the vehicle or the like based on the recognition result of the surrounding object.

It is an object of the image recognition system 10 according to an embodiment of the present invention to decrease the number of times for the comparison to reduce the time required for the recognition processing by narrowing down the range of the template image used for the recognition and comparison range based on the previous recognition result when recognizing a subject by the comparison of the captured image and the template image.

The image recognition system 10 includes an image capturing unit 100, a temporary memory 110, an image capturing control unit 120, a speed measurement unit 130, a steering angle measurement unit 140, a recognition unit 150, and a displaying unit 160. The image capturing unit 100 captures an image around the vehicle. For example, the image capturing unit 100 is oriented so that the optical axis is oriented ahead of the vehicle, and captures the image ahead of the vehicle. Here, the image capturing unit 100 may capture a still image, or may capture video. The image capturing unit 100 includes an optical system 102, a CCD 104, and a captured signal processing unit 106. The optical system 102 focuses optical image of the subject on photo detecting surface of the CCD 104. The CCD 104 includes a plurality of photo detectors which output electric charges, which are accumulated in each of the photo detectors by an optical image of the subject focused by the optical system 102, to the captured signal processing unit 106 as an analog electrical signal. The captured signal processing unit 106 resolves the analog electrical signal of the subject image received from the CCD 104 into R, G, and B components. Then, the captured image processing unit 106 performs A/D conversion of the analog electrical signal resolved into R, G, and B components, and outputs digital image data of the subject image to the temporary memory 110. The temporary memory 110 is volatile memory, such as DRAM, and stores the image data output from the captured signal processing unit 106.

The image capturing control unit 120 controls the mechanism of the image capturing unit 100, and controls operation of the image capturing unit 100. For example, the image capturing control unit 120 controls image capturing timing, exposure time, zoom, white balance, and the like in the image capturing unit 100. The speed measurement unit 130 measures speed of the vehicle, and outputs the measured speed to the recognition unit 150. Moreover, the speed measurement unit 130 outputs the measured speed to the image capturing control unit 120, and makes the image capturing control unit 120 control the image capturing unit 100 based on the speed. The steering angle measurement unit 140 measures steering angle of the vehicle, and outputs the measured steering angle to the recognition unit 150.

The recognition unit 150 includes a first recognition unit 152, a template selection unit 154, a region estimate unit 156, and a second recognition unit 158, and it recognizes a subject included in the image captured by the image capturing unit 100. The first recognition unit 152 recognizes a candidate of the subject in the image by performing so-called pattern matching processing which compares the image captured by the image capturing unit 100 and stored on the temporary memory 110 with a predetermined template image. Then, the first recognition unit 152 outputs the recognition result to the template selection unit 154 and the region estimate unit 156. Here, the recognition result may be information indicating a candidate of the subject, position and/or size of the region indicating the subject, and the template image used for the recognition.

The template selection unit 154 selects a template image to be compared with an image captured by the image capturing unit 100 after a predetermined duration has been elapsed from a time of capturing the image used for the recognition of the candidate of the subject by the first recognition unit 152 based on the candidate of the subject recognized by the first recognition unit 152, and outputs the information indicating the selected template image to the second recognition unit 158. The region estimate unit 156 estimates the position and size of the region indicating the subject in the image captured by the image capturing unit 100 after the predetermined duration has been elapsed from the time of capturing the image used for the recognition of the candidate of the subject by the first recognition unit 152 based on the region indicating the subject recognized by the first recognition unit 152, speed of the vehicle measured by the speed measurement unit, and the steering angle measured by the steering angle measurement unit 140, and outputs the estimate result to the second recognition unit 158. Moreover, the region estimate unit 156 may output the estimate result to the template selection unit 154, and may make the template selection unit 154 select the template image based on the estimate result.

The second recognition unit 158 recognizes the subject included in the image of the range by comparing the image of the range determined based on the position and size of the region indicating the subject estimated by the region estimate unit 156 among the images captured by the image capturing unit 100 after a predetermined duration has been elapsed from the time of capturing the image which is used by the first recognition unit 152 for the recognition of the candidate of the subject. Then, the second recognition unit 158 outputs the recognition result to the template selection unit 154, the region estimate unit 156, and the displaying unit 160. The displaying unit 160 provides the driver or the like with the recognition result by displaying the recognition result by the second recognition unit 158 on a display unit, such as a CRT display or an LCD panel.

According to the image recognition system 10 of the embodiment of the present invention, since the number of times for comparing the images in the recognition processing can be decreased by narrowing down the template image used for the recognition processing in the image to be captured next based on the candidate of the subject recognized in the image previously captured, even if it is the case where the recognition processing is performed highly accurately, the time required for the recognition of the subject can be reduced. For, example, even if it is the case where the subject cannot be uniquely recognized due to the low resolution of the image which indicates the subject in the captured image since the distance between the vehicle and the subject is long, the image recognition system 10 can perform the recognition processing only using the template image corresponding to the candidate which is narrowed down in advance when highly accurate recognition processing can be performed by the image captured after narrowing down the subject to the plurality of candidates. Thereby, compared with the conventional image recognition system which always performs the image recognition using all template images, the subject can be recognized in shorter time. Therefore, the safety during driving the vehicle can be improved and a driving assist having quick response can be realized, e.g., promptly alerting driver when there is a person near the vehicle.

In addition, in the above description, the first recognition unit 152 recognizes the candidate of the subject in the image by comparing the captured image with the template image. However, the first recognition unit 152 may recognize the subject in the image using other template data, such as a numerical value and/or an equation instead of the template image. Moreover, similarly, the template selection unit 154 may recognize the subject in the captured image by comparing the captured image with other template data, such as a numerical value and/or an equation instead of comparing with the template image. As described above, the image recognition system 10 according to the present embodiment can recognize the subject in the captured image using various template data, such as numerical value and/or an equation with sufficient accuracy in short time.

Figure 2A:
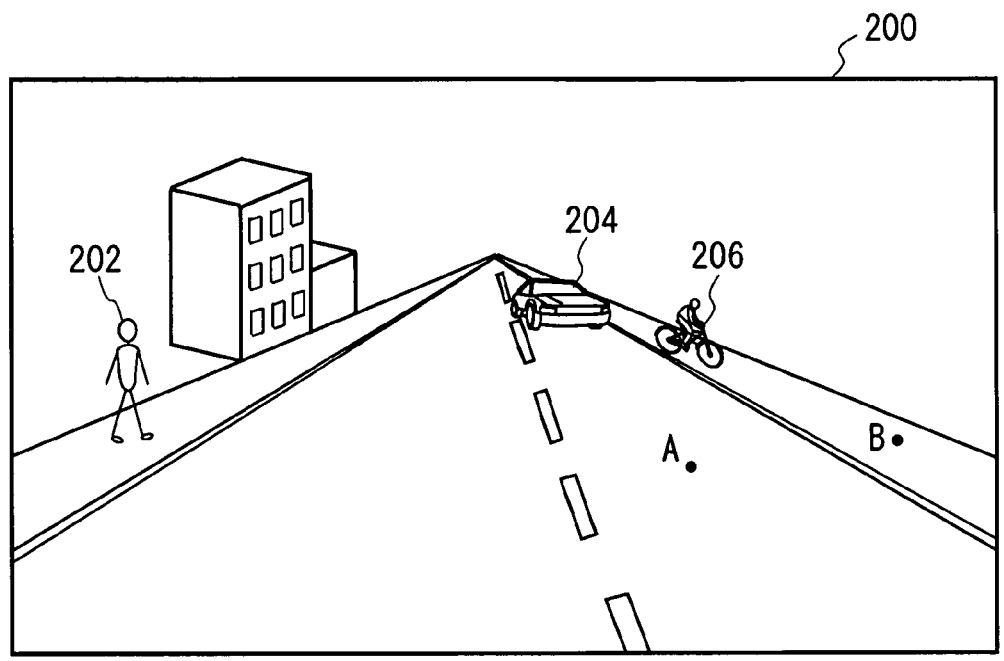
FIGS. 2A and 2B are a drawing exemplary showing a processing in a recognition unit according to an embodiment of the present invention.
Figure 2B:
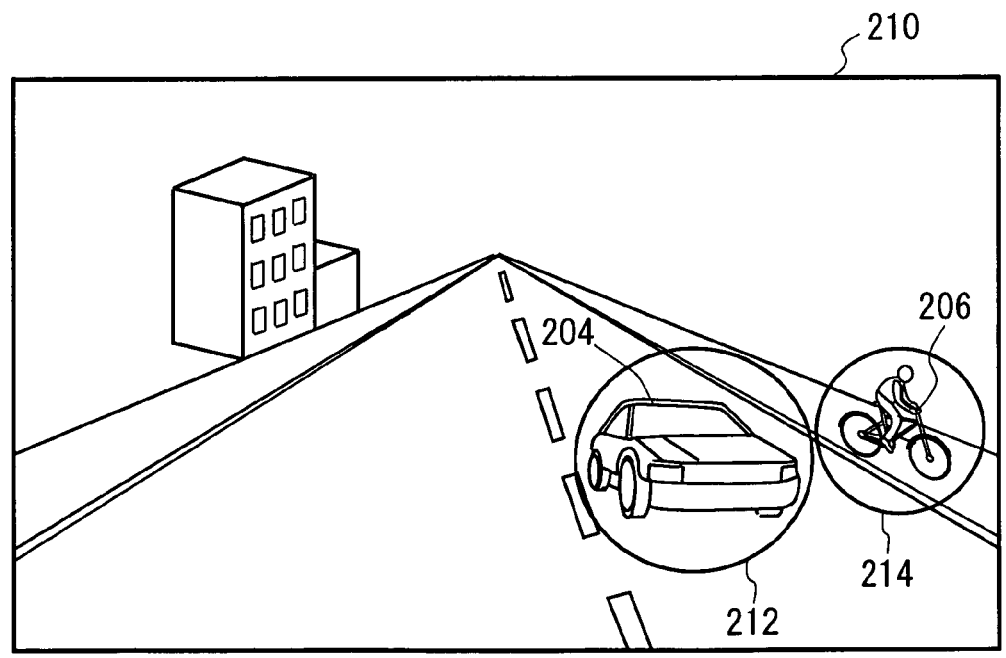

FIGS. 2A and 2B show an example of the processing in the recognition unit 150 according to an embodiment of the present invention. FIG. 2A shows a front image 200 of the vehicle captured by the image capturing unit 100. Moreover, FIG. 2B shows a front image 210 of the vehicle captured by the image capturing unit 100 after a predetermined duration has been elapsed from a time of capturing the image 200.

First, the first recognition unit 152 recognizes a subject in the image 200 using well-known pattern matching technology. For example, the first recognition unit 152 extracts edges of a plurality of subjects from the image 200 by performing edge extraction processing using a well-known method. Then, the first recognition unit 152 performs transformation processing e.g., enlargement, reduction, rotation, etc. so as to align the shape of the template image with the shape of the edge of each of the extracted subject for the predetermined template image about type of the subject and the direction to which the subject are oriented. Then, the first recognition unit 152 compares the transformed template image with the image of the region indicating the subject in the image 200 or binary of the image 200. Here the first recognition unit 152 may compare the template image with the image of the region indicating the subject per pixel, and when the proportion of the coincident pixels is more than a predetermined reference value, it may judge that the images are coincident with each other. Then, when the first recognition unit 152 judges that the image of the region indicating the subject is coincident with the template image, it recognizes the subject as an object indicated by the template image.

Then, the point that the first recognition unit 152 recognizes the candidate of the subject will be explained. In FIG. 2A, since the subject 202 exists in a position comparatively near the vehicle, the resolution of the image indicating the subject 202 is high, and the first recognition unit 152 can recognize the subject 202 to be a person accurately enough. However, since the subject 204 and the subject 206 exist in the position distant from the vehicle, the resolution of the image indicating the subjects is low, and the first recognition unit 152 cannot recognize the subjects accurately enough. Then, the first recognition unit 152 nominates a plurality of candidates instead of recognizing the subject uniquely. For example, as candidates of the subject 204, the first recognition unit 152 nominates an automobile and a motorcycle, and nominates a person, a bicycle, and a motorcycle as candidates of the subject 206. Here, the first recognition unit 152 may nominate not only the subject's type but also a subject's direction and/or maneuver condition as candidates, or may nominate the template images itself as candidates.

In addition, since the first recognition unit 152 performs the recognition processing to whole of the image 200, it takes long time to finalize the recognition, and in order to recognize the subject uniquely, it may be unable to perform the recognition processing accurately enough. In such cases, the first recognition unit 152 reduces the time for the recognition processing by restricting the number of template images to be used for the pattern matching, in which only the template images whose orientation of the subject is 0 degrees and 180 degrees is used, for the template images for the type of the subject. However, it is rare that the orientation of the real subject is coincident with the orientation of the subject in the template image in this case, and in many cases, the first recognition unit 152 fails to perform the recognition. Then, the first recognition unit 152 performs the recognition of the subject successfully by lowering the reference value at the time of judging the coincidence of the captured image and the template image. However, since the accuracy of the recognition falls off by lowering the reference value, the first recognition unit 152 cannot recognize the subject uniquely, but only be able to nominate a plurality of candidates.

Moreover, the first recognition unit 152 may recognize the probability that the candidate is the subject when nominating the candidates of the subject. For example, the first recognition unit 152 may estimates probability that the subject 206 is a person is 10%, probability that the subject 206 is a bicycle is 40%, and probability that the subject 206 is a motorcycle is 30%.

Then, the region estimate unit 156 estimates position and size, in the image 210, of the region indicating the subject recognized in the image 200 based on the recognition result by the first recognition unit 152. First, the region estimate unit 156 receives distance from the vehicle to the subject at the time of capturing the image 200. For example, the region estimate unit 156 may receive the distance to the subject from the vehicle using a focusing sensor. Moreover, for example, the image capturing unit 100 is configured to simultaneously capture images from different directions, and the region estimate unit 156 may receive the distance to the subject from the vehicle based on the parallax in the images which are captured simultaneously. Moreover, for example, the region estimate unit 156 may receive the distance to the subject from the vehicle based on the type of the candidate of the subject recognized by the first recognition unit 152, the size of the area indicating the subject in the image 200, and the capturing magnification of the image capturing unit 100. Specifically, the region estimate unit 156 computes the distance in which the automobile having the size of the region indicating the subject 204 in the image 200 is captured based on the based on the actual size of the automobile corresponding to the template image used for the recognition and the capturing magnification when the probability that the subject 204 is an automobile is recognized to be the highest among all candidates Then, the region estimate unit 156 computes the position of the subject at the time of capturing the image 200 based on the received distance from the vehicle to the subject, the centroid position of the region indicating the subject in the image 200, and the direction of the optical axis of the image capturing unit 100. Then, the region estimate unit 156 computes a predictor of the centroid of the region indicating the subject in the image 210 and a predictor of the distance from the vehicle to the subject at the time of capturing the image 210 based on the computed position of the subject and the speed of the vehicle by assuming that the subject is stationary. Then, the region estimate unit 156 computes a predictor of the size of the region indicating the subject in the image 210 based on the size of the region indicating the subject in the image 200, the distance from the vehicle to the subject at the time of capturing the image 200, and a predictor of the distance from the vehicle to the subject at the time of capturing the image 210.

Here, instead of estimating the subject is stationary, the region estimate unit 156 may estimate the moving direction and speed based the type and orientation of the candidate of the subject recognized by the first recognition unit 152, and may compute a predictor of the centroid position and the size of the region indicating the subject in the image 210 more accurately. Moreover, the region estimate unit 156 may compute a predictor of the centroid position and the size of the region indicating the subject in the image 210 further based on the steering angle of the vehicle measured by the steering angle measurement unit 140. Thereby, even if it is the case where the vehicle is not going straight on, the position and the size of the region indicating the subject can be estimated accurately enough. As mentioned above, the region estimate unit 156 estimates the position indicating the subject 204 in the image 210 as "A", and estimates the position indicating the subject 206 in the image 210 as "B".

On the other hand, the template selection unit 154 selects a template image to be compared with the image 210 based on the candidate of the subject in the image 200 recognized by the first recognition unit 152. The template image to be selected by the template selection unit 154 may be the same template image as the template image used by the first recognition unit 152, or it may be a different template image. For example, the template selection unit 154 may select a plurality of template images corresponding to type of subjects recognized by the first recognition unit 152, e.g., template images seen from every orientation.

Moreover, when the probability for each candidate of the subjects has been recognized by the first recognition unit 152, the template selection unit 154 may settle the number of the template images selected for every candidate according to the degree of the probability of the candidates. For example, when the first recognition unit 152 recognizes that the probability that the subject 206 is a person is 10%, the probability that the subject 206 is a bicycle is 40% and the probability that the subject 206 is a motorcycle is 30%, the template selection unit 154 selects template images of bicycles the most, which has the highest probability, then it may select the fewer number of template images of motorcycles and the much fewer number of template images of persons.

Moreover, when the probability of the candidate is greater than the predetermined reference value, the template selection unit 154 may select a template image corresponding to the candidate. Thereby, since the recognition processing can be performed only for the candidate having high probability of the recognition result by the second recognition unit 158, the time required for the recognition processing can be reduced.

Moreover, the larger the size of the region indicating the subject in the image 210 is, a template image having the larger size may be selected as the template image to be compared with the image 210. Since the larger the size of the subject image is, the larger amount of information may be obtained from the captured image, the recognition can be performed more accurately also in the recognition processing by pattern matching. Therefore, the larger the size of the estimated subject image is, the larger size of the template image may be used for the recognition processing, so that the highly accurate recognition result is acquirable in a short time because the processing of acquiring the recognition result having low accuracy may be omitted.

Then, the second recognition unit 158 recognizes the subject included in both the image 200 and the image 210 by comparing the image 210 with the template image selected by the template selection unit 154. Here, the second recognition unit 158 narrows down the range to be compared with the template image in the image 210 based on the estimate result of size and position of the subject image in the region estimate unit 156. Specifically, the second recognition unit 158 selects a predetermined range 212 centering on the position "A" of the subject 204 in the image 210 estimated by the region estimate unit 156 in the image 210 as a range to be compared with the template image. Here, the larger the size of the subject 204 in the image 210 estimated by the region estimate unit 156 is, the larger the second recognition unit 158 makes the range 212 become. Furthermore, the shape of the range selected by the second recognition unit 158 may be circular as shown in the drawings. Moreover, it may be elliptic of which the major axis is parallel with the movement direction of the subject in order to perform the comparison more efficiently.

Then, the second recognition unit 158 recognizes the subject 204 by comparing the image shown by the range 212 with the template image selected by the template selection unit 154 about the subject 204 using well-known pattern matching technology. Similarly, the second recognition unit 158 recognizes the subject 206 by comparing the image of the range 214, which is determined according to the estimated size of the subject 206 centering on the position "B", with the template image selected by the template selection unit 154 about the subject 206.

Here, the second recognition unit 158 may perform the recognition more accurately than the recognition processing in the first recognition unit 152. For example, the template selection unit 154 may select more template images, for example, the template images corresponding to more types, than the template images used for types in the first recognition unit 152, and the second recognition unit 158 may perform the recognition processing using those template images. Then, while the first recognition unit 152 recognizes the candidate of the subject when correlation of the captured image and the template image is greater than a predetermined first reference value, the second recognition unit 158 may recognize the subject when the correlation of the captured image and the template image selected by the template selection unit 140 is greater than the first reference value and greater than a predetermined second reference value.

Moreover, for example, the second recognition unit 158 may recognize the subject included in the captured image using a different template image from the template image used by the first recognition unit 152. Specifically, the second recognition unit 158 may recognize the subject included in the captured image using a template image of which the resolution is higher than that of the template image used by the first recognition unit 152.

Moreover, for example, when comparing the captured image with the template image, each of the first recognition unit 152 and the second recognition unit 158 detects an outstanding point from each image, and compares the image near the outstanding point. In this case, the second recognition unit 158 may detect greater number of outstanding points than the outstanding points detected by the first recognition unit 152, and may compare each image.

Moreover, for example, the second recognition unit 158 may employ a recognition method of which the load for the processing is heavier than the recognition method used when the first recognition unit 152 recognizes the subject. Specifically, when the first recognition unit 152 compares the captured image with a template image about a subject's color included in the image, the second recognition unit 158 may compare the captured image with the template image about a subject's shape included in the image.

Moreover, for example, when comparing the captured image with a template image, each of the first recognition unit 152 and the second recognition unit 158 generates a gray level histogram about each image, and compares the generated gray level histogram. In this case, the second recognition unit 158 may generate a gray level histogram with resolution higher than the resolution in the first recognition unit 152, e.g., the second recognition unit 158 generates a gray level histogram having 256 gray scales when the resolution in generating a gray level histogram by the first recognition unit 152 is 16 gray scales.

Moreover, while the first recognition unit 152 recognizes a plurality of candidates of the subject when each probability of the plurality of candidates is recognized from the captured image, the second recognition unit 158 may recognize the subject included in the captured image by preferentially using the template image selected by the template selection unit 154 about the candidate having higher probability among a plurality of candidates. Thereby, the second recognition unit 158 can recognize the subject in shorter time.

According to the image recognition system 10 according to the present embodiment, the range of the image for the pattern matching to be performed to the image to be captured next time can be narrowed down by estimating the position and size of the region indicating the subject in the image to be captured next time based on the recognition result of the subject in the previously captured image. Thereby, since the number of times for comparing the image can be decreased, time required for the recognition processing can be reduced.

Moreover, according to the image recognition system 10 according to the present embodiment, since the time required for the recognition processing in the second recognition unit 158 can be reduced by narrowing down the range of the image for the recognition while narrowing down the candidates of the subject in advance, while using more template images using surplus time caused by the processing, the type, orientation, running state and the like can be recognized more in detail and more accurately by detecting a template image having higher correlation than the recognition processing by the first recognition unit 152 among those template images.

Figure 3:
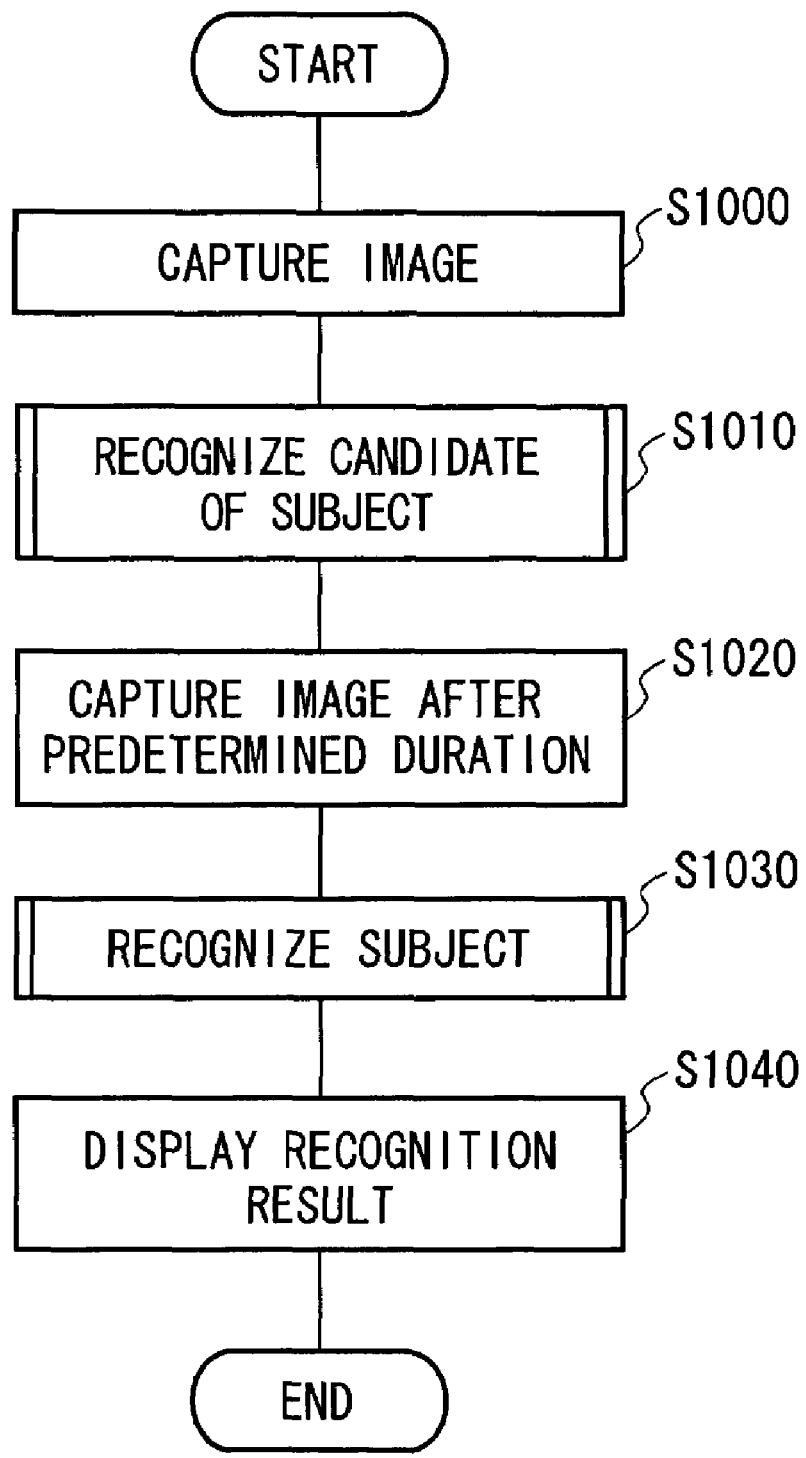
FIG. 3 is a flow chart exemplary showing a processing flow of the image recognition system 10 according to an embodiment of the present invention.

FIG. 3 is a flow chart exemplary showing processing flow in the image recognition system 10 according to an embodiment of the present invention. First, the image capturing unit 100 captures the image around the vehicle (S1000). Then, the recognition unit 150 recognizes a candidate of the subject included in the captured image (S1010). Then, the capturing control section 120 makes the image capturing unit 100 capture the image after a predetermined duration has been elapsed from a time of capturing the image in S1000 (S1020). Here, when the image capturing unit 100 captures a dynamic image, the predetermined duration may be a duration of one frame in the dynamic image, or may be a duration for a predetermined number of frames, e.g., three frames or the like. Moreover, it is preferable that the predetermined duration is short enough to maintain the accuracy of the estimation of the position and size of the region indicating the subject by the region estimate unit 156.

Furthermore, the faster the speed of the vehicle measured by the speed measurement unit 130 is, the shorter the predetermined duration, i.e., interval for capturing the image by the image capturing unit, may become. Since the captured image changes a lot in a short time when the speed of the vehicle is fast, the accuracy of the estimation of the position and size of the region indicating the subject by the region estimate unit 156 falls off. However, by reducing the time interval for capturing the image according to the speed, the position and size of the region indicating the subject can be estimated highly accurately and the time required for the recognition processing in the second recognition unit 158 can be reduced.

Then, the recognition unit 150 recognizes the subject included in the image captured in S1020 using the recognition result in S1010 (S1030). Then, the displaying unit 160 displays the recognition result of the subject by the recognition unit 150 (S1040). For example, the displaying unit 160 displays the frame which is superposed on the captured image to surround the recognized subject. Here, the thickness of the frame may be thicker for the subject of which the distance to the vehicle is nearer than other subjects, so that the driver may easily recognize the recognition result while the displaying unit 160 displaying the frame using a predetermined color for each type of the subject. Moreover, the image recognition system 10 may provide the driver or the like with the recognition result with voice. For example, the image recognition system 10 may output the voice from a loudspeaker which informs that there is a person near the vehicle.

Figure 4:
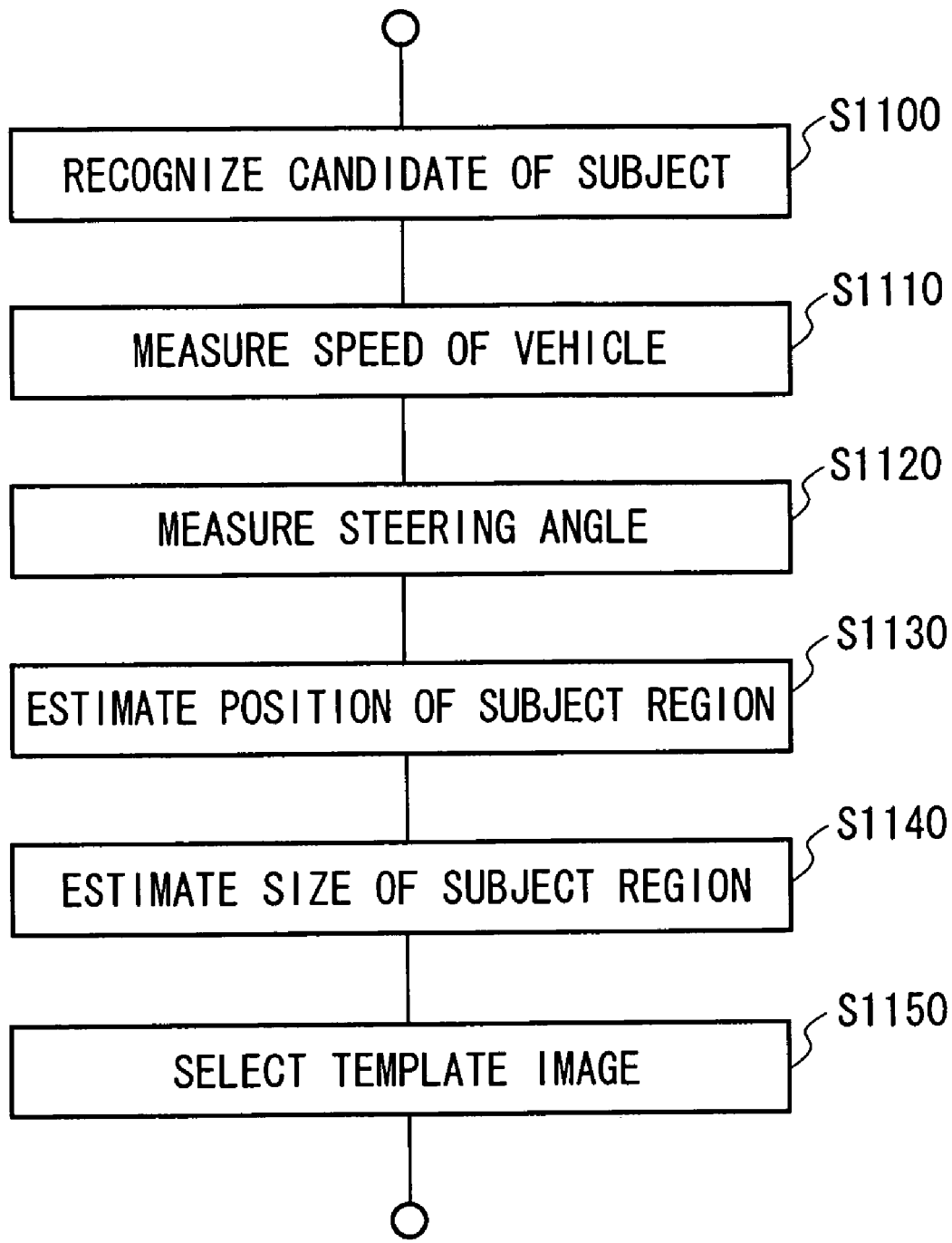
FIG. 4 is a flow chart showing detail of S1010 in FIG. 3.

FIG. 4 is a flow chart showing detail of S1010 in FIG. 3. First, the first recognition unit 152 recognizes a candidate of the subject included in the image by comparing the captured image with a predetermined template image (S1100). Then, the speed measurement unit 130 measures the speed of the vehicle based on the number of revolution of the engine or the like (S1110). Then, the steering angle measurement unit 140 measures the steering angle of the vehicle based on the rotation angle of the steering or the like (S1120).

Then, based on the position and size of the region indicating the subject recognized by the first recognition unit 152 in the captured image and on the speed and steering angle of the vehicle, the region estimate unit 156 estimate a position of the region indicating the subject in the image to be captured by the image capturing unit 100 after a predetermined duration has been elapsed from a time of capturing the image by the image capturing unit 100 (S1130). Then, based on the position and size of the region indicating the subject recognized by the first recognition unit 152 in the captured image and on the speed and steering angle of the vehicle, the region estimate unit 156 estimate a size of the region indicating the subject in the image to be captured by the image capturing unit 100 after a predetermined duration has been elapsed from a time of capturing the image by the image capturing unit 100 (S1140). Then, the template selection unit 154 selects the template image to be compared with the image captured by the image capturing unit 100 after a predetermined duration has been elapsed from a time of capturing the image in S1000 based on the candidate of the subject recognized by the first recognition unit 152 (S1150).

Figure 5:
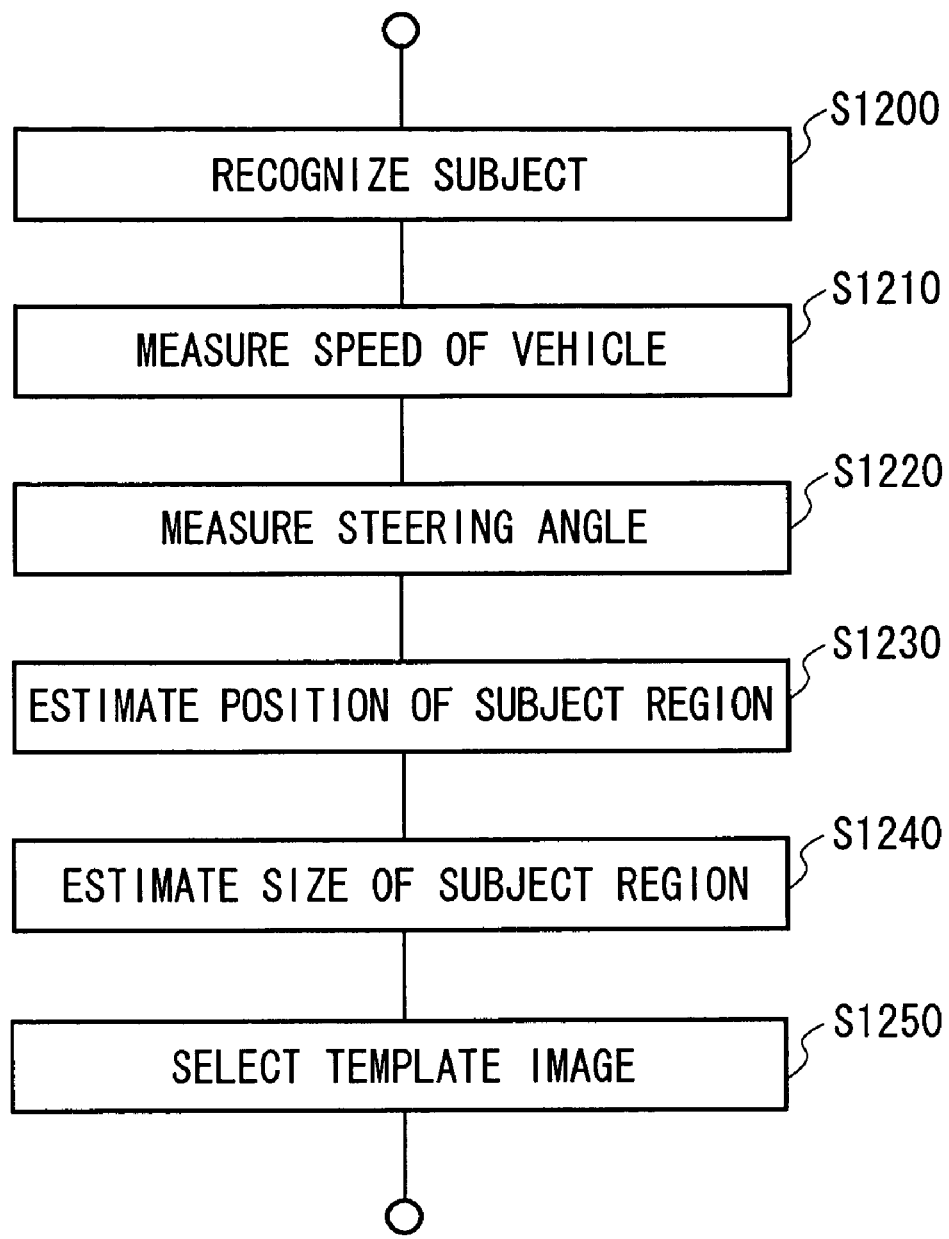
FIG. 5 is a flow chart showing detail of S1030 in FIG. 3.
Figure 6:
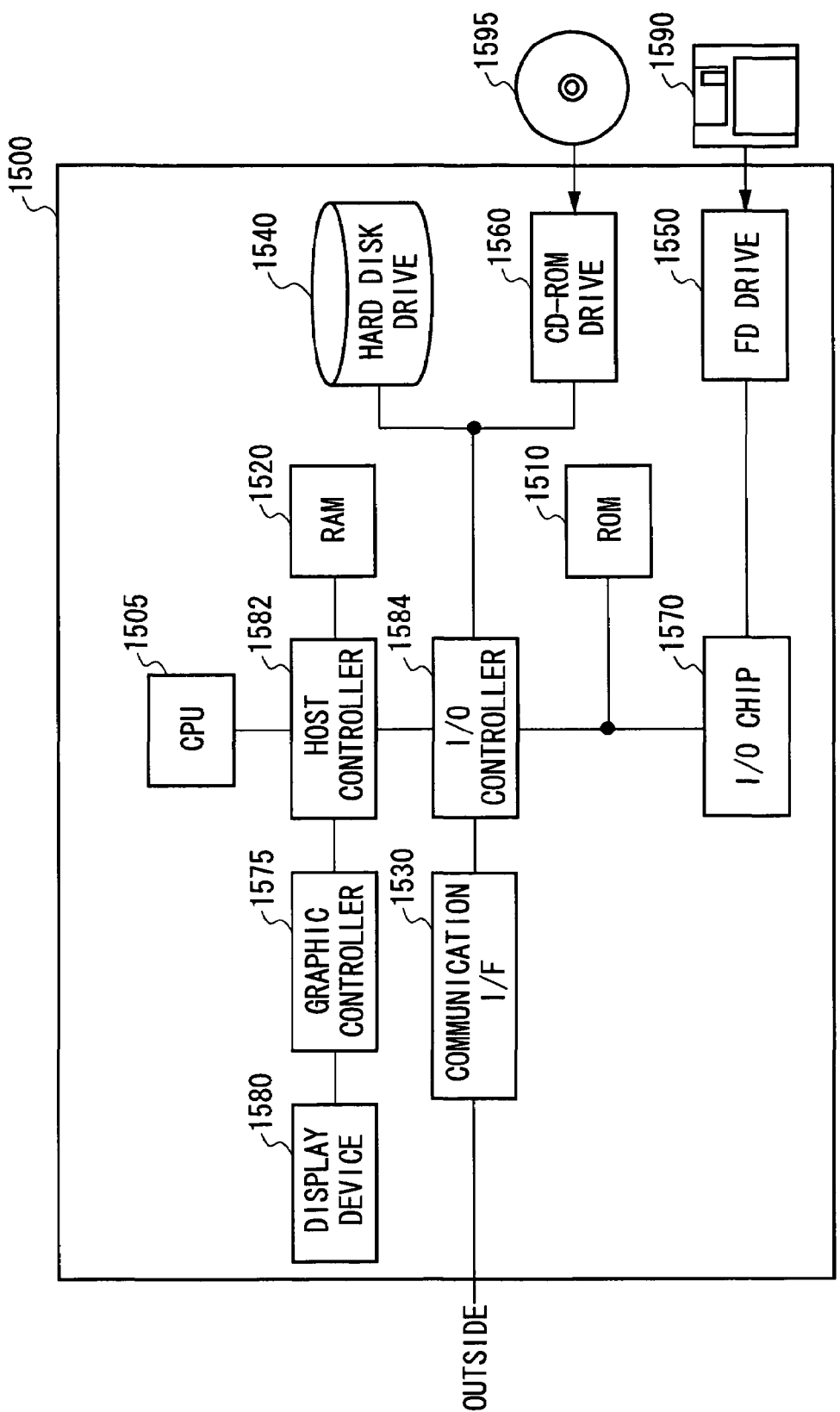
FIG. 6 is a block diagram exemplary showing a hardware configuration of a computer 1500 according to an embodiment of the present invention.

FIG. 5 is a flow chart showing detail of S1030 in FIG. 3. First, the second recognition unit 158 recognizes the subject included in the image of the range by comparing the image of the range selected based on the position and size of a region indicating the subject which is estimated by the region estimate unit 156 among the captured images and the template image selected by the template selection unit 154 (S1200). Then, the speed measurement unit 130 measures the speed of the vehicle (S1210). Then, the steering angle measurement unit 140 measures the steering angle of the vehicle (S1220). Then, the region estimate unit 156 estimates the position of the region indicating the subject in the image to be captured by the image capturing unit 100 after a predetermined duration has been elapsed from a time of capturing the image in S1220 based on the position and size of the region indicating the subject recognized by the second recognition unit 158 in the captured image, and the speed and steering angle of the vehicle (S1230). Then, the region estimate unit 156 estimates the position of the region indicating the subject in the image to be captured by the image capturing unit 100 after a predetermined duration has been elapsed from a time of capturing the image in S1220 based on the position and size of the region indicating the subject recognized by the second recognition unit 158 in the captured image, and the speed and steering angle of the vehicle (S1240).

Then, the template selection unit 154 selects the template image to be compared with the image captured by the image capturing unit 100 after a predetermined duration has been elapsed from a time of capturing the image in S1020 based on the recognition result by the second recognition unit 158 (S1250). Specifically, when the subject could not be recognized by the second recognition unit 158, the template selection unit 154 select a template image which is different from the template image which is compared with the captured image by the second recognition unit 158 as a template image to be compared with the image captured by the image capturing unit after a predetermined duration has been elapsed from a time of capturing the image in S1020. By this, even if it is the case where the recognition result of the first recognition unit is not correct and the template image selected by the template selection unit 154 selected is not suitable, when recognizing by the second recognition unit 158 for the next time, since the template image which were not coincident may be excluded, the time required for the recognition processing can be reduced more than in the case where the recognition is done using all template images.

Since the recognition processing by the second recognition unit 158 can obtain a more highly accurate recognition result than the recognition processing by the first recognition unit 152, by selecting a template image while estimating the position and size of a region indicating the subject based on the recognition result by the second recognition unit 158, the recognition processing can be performed more accurately in shorter duration when the second recognition unit 158 performs the recognition processing to the image captured by the image capturing unit 100 after a predetermined duration has been elapsed after a time of capturing the image in S1020.

In the above description, the image recognition system 10 recognizes the subject included in the image highly accurately in short duration by performing image recognitions twice using the first recognition unit 152 and the second recognition unit 158. However, instead of this, the subject included in the image may be recognized by the image recognition system 10 which performs three times or more of image recognitions. In this case, in order to perform the image recognition more accurately in the posterior image recognition among all the image recognitions, the image recognition system 10 may increase the number of the template images to be selected, may use a template image with higher resolution, or may use the image recognition method requiring heavier load for the processing.

Moreover, in the above description, although the image capturing unit 100 is provided in the vehicle, the image capturing unit 100 may be provided in another movable body and may capture the circumference of the movable body. For example, the image capturing unit 100 may be provided in an endoscope. Thereby, when inspecting organ and organization in living body using the endoscope, even if it is the case where the endoscope is being moved, the subject such as an organ and an organization included in the captured image can be recognized in shorter time highly accurately.

Furthermore, the image capturing unit 100 may be provided in the stationary object instead of being provided in a movable body. As for two images captured at different timings, even if it is this case when recognizing the subject which is moving relatively to the image capturing unit 100 from the image captured by the image capturing unit 100, since the position of the subject in the image changes, the subject may be recognized highly accurately in short time by using the image recognition system 10 according to the present embodiment.

FIG. 8 is a block diagram exemplary showing a hardware configuration of a computer 1500 according to an embodiment of the present invention. The computer 1500 according to the present embodiment includes a CPU control unit including CPU 1505, RAM 1520, a graphic controller 1575 and a display device 1580 which are connected mutually by a host controller 1582, an I/O unit including communication interface connected to the host controller 1582 by the an I/O controller 1584, a hard disk drive 1540 and a CD-ROM drive 1560, a legacy I/O unit including ROM 1510 connected to the I/O controller 1584, a FD drive 1550 and an I/O chip 1570.

The host controller 1582 connects the RAM 1520 to the CPU 1505 accessing the RAM 1520 at the high transmission rate and the graphic controller 1575. The CPU 1505 operates on a basis of the programs stored on the ROM 1510 and the RAM 1520 and controls each unit. The graphic controller 1575 obtains the image data generated by the CPU 1505 on the frame buffer formed in the RAM 1520 and makes the display device 1580 execute display. Instead, the graphic controller 1575 may include the frame buffer storing the image data generated by the CPU 1505.

The I/O controller 1584 connects the host controller 1582 to the communication interface 1530 which is an I/O device at relatively high speed, the hard disk drive 1540 and the CD ROM drive 1560. The communication interface 1530 communicates with other devices via a network. The hard disk drive 1540 stores programs or data used by the CPU 1505 in the computer 1500. The CD-ROM drive 1560 reads programs or data from the CD-ROM 1595 and provides them for the hard disk drive 1540 via the RAM 1520.

Moreover, the ROM 1510, the F/D drive 1550 and the relatively low-speed I/O device of the I/O chip 1570 in the I/O controller 1584. The ROM 1510 stores a boot program executed by the computer 1500 on starting or programs depending on the hardware of the computer 1500. The FD drive 1550 reads programs or data from the FD 1590 and provides them for the hard disk drive 1540 via the RAM 1520. The I/O chip 1570 connects various kinds of the I/O device via the FD drive 1550 or such as, a parallel port, a serial port, a keyboard, and a mouse port.

The programs provided for the hard disk drive 1540 via the RAM 1520 are stored on a recording medium such as the FD 1590, the CD-ROM 1595 or an IC card and are provided for the user. The programs are read from the recording medium, are installed on the hard disk drive 1540 in the computer 1500 via the RAM 1520 and are executed by the CPU 1505. The programs installed in the computer 1500 and executed operate on the CPU 1505 and make the computer 1500 perform functions as the image recognition system 10 explained with reference to FIG. 1 to FIG. 5.

The above-mentioned programs may be stored on an external recording medium. As a recording medium, an optical recording medium such as DVD, PD, a magneto optical recording medium such as MD, a tape medium, a semiconductor memory such as an IC card can be used in addition to the FD 1590, CD-ROM 1595. Moreover, a memory device, such as the hard disk installed in the sever system connected to the exclusive communication network or Internet, or RAM, may be used as the recording medium and the programs may be provided for the computer 1500 via the network.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An image recognition system which recognizes a subject, which is moving with respect to an image capturing unit provided in a vehicle, included in an image captured by the image capturing unit, comprising:

the image capturing unit;

a first recognition unit which recognizes a candidate of the subject included in the image captured by said image capturing unit by comparing the image captured by said image capturing unit with predetermined template data;

a template selection unit which selects the template data to be compared with an image captured by said image capturing unit after a predetermined duration has been elapsed from a time of capturing an image used for recognition of the candidate by said first recognition unit;

a second recognition unit which recognizes the subject by comparing the image, which is captured by said image capturing unit after a predetermined duration has been elapsed from a time of capturing an image used for recognition of the candidate by said first recognition unit, with the template data selected by said template selection unit;

a speed measurement unit which measures speed of the vehicle; and a region estimate unit which estimates a position of a region indicating the subject in an image captured by said image capturing unit after a predetermined duration has been elapsed after a time of capturing an image used for recognition of the candidate by said first recognition unit based on a region indicating the subject recognized by said first recognition unit in an image captured by said image capturing unit, and on the speed, wherein said second recognition unit recognizes the subject by comparing a predetermined range of image centering on a position estimated by said region estimate unit among images captured by said image capturing unit with the template data selected by said template selection unit; and further comprising a steering angle measurement section which measures a steering angle of the vehicle, wherein said region estimate section estimates a position of a region indicating the subject further based on the steering angle.

2. The image recognition system as claimed in claim 1, wherein said image capturing unit is adapted to capture a circumference of the vehicle.

3. The image recognition system as claimed in a claim 1, wherein said first recognition unit recognizes the candidate of the subject when correlation of an image captured by said image capturing unit and the template data is greater than a predetermined first reference value, and said second recognition unit recognizes the subject when correlation of an image captured by said image capturing unit and the template data selected by said template selection unit is greater than the first reference value and greater than a predetermined second reference value, which is greater than the first reference value.

4. The image recognition system as claimed in claim 1, wherein said first recognition unit recognizes probability of the candidate by comparing an image captured by said image capturing unit with the predetermined template data, and said template selection unit selects the template data corresponding to the candidate as the a template data to be compared with an image captured by said image capturing unit after a predetermined duration has been elapsed from a time of capturing an image used for recognition of the candidate by said first recognition unit when the probability of the candidate recognized by said first recognition unit is greater than a predetermined reference value.

5. The image recognition system as claimed in claim 1, wherein said template selection unit selects the template data which is different from the template data compared with the captured data as the a template data to be compared with an image captured by said image capturing unit after a predetermined duration has been elapsed from a time of capturing an image used for recognition of the candidate by said second recognition unit when the subject could not be recognized by said second recognition unit.

6. The image recognition system as claimed in claim 1, wherein said region estimate section further estimates a size of a region indicating the subject in an image captured by said image capturing unit after a predetermined duration has been elapsed after a time of capturing an image used for recognition of the candidate by said first recognition section based on a region indicating the subject recognized by said first recognition unit in an image captured by said image capturing unit, and on the speed, and said second recognition section recognizes the subject by comparing a predetermined range of an image according to a size estimated by said region estimate section centering on a position estimated by said region estimate section among images captured by said image capturing unit with the template data selected by said template selection section.

7. The image recognition system as claimed in claim 6, wherein the template data are images, and the larger a size of a region indicating the subject estimated by said region estimate unit is, the larger size of image said template selection unit selects as the template data to be compared with an image of the region indicating the subject in an image captured by said image capturing unit after a predetermined duration has been elapsed after a time of capturing an image used for recognition of the candidate by said first recognition unit.

8. The image recognition system as claimed in claim 1, further comprising a capturing control unit which controls said image capturing unit, wherein the faster the speed measured by said speed measurement unit is, the shorter a time interval for capturing an image by said image capturing unit becomes.

9. An image recognition method which recognizes a subject, which is moving with respect to an image capturing unit provided in a vehicle, included in an image captured by the image capturing unit, comprising:

a first image capturing step of capturing an image by the image capturing unit;

a first recognition step of recognizing a candidate of the subject included in the image captured in said first image capturing step by comparing the image captured in said image capturing step with predetermined template data;

a template selection step of selecting the template data to be compared with an image captured by the image capturing unit after a predetermined duration has been elapsed from a time of capturing an image in said first image capturing step;

a second image capturing step of capturing an image by the image capturing unit after a predetermined duration has been elapsed from a time of capturing an image in said first image capturing step;

a second recognition step of recognizing the subject by comparing the image captured in said second image capturing unit with the template data selected in said template selection step;

a step of measuring a speed of the vehicle by a speed measurement unit; and a step of using a region estimate unit to estimate a position of a region indicating the subject in an image captured by said image capturing unit after a predetermined duration has been elapsed after a time of capturing an image used for recognition of the candidate by said first recognition unit based on a region indicating the subject recognized by said first recognition unit in an image captured by said image capturing unit, and on the speed, wherein said second recognition unit recognizes the subject by comparing a predetermined range of image centering on a position estimated by said region estimate unit among images captured by said image capturing unit with the template data selected by said template selection unit; and further comprising:

a step of measuring a steering angle of the vehicle by a steering angle measurement section, wherein said region estimate section estimates a position of a region indicating the subject further based on the steering angle.

10. A computer readable medium having an image recognition program stored thereon, which when executed by a computer causes the computer to act as an image recognition system which recognizes a subject, which is moving with respect to an image capturing unit provided in a vehicle, included in an image captured by the image capturing unit, comprising:

the image capturing unit;

a first recognition unit which recognizes a candidate of the subject included in the image captured by said image capturing unit by comparing the image captured by said image capturing unit with predetermined template data;

a template selection unit which selects the template data to be compared with an image captured by said image capturing unit after a predetermined duration has been elapsed from a time of capturing an image used for recognition of the candidate by said first recognition unit;

a second recognition unit which recognizes the subject by comparing the image, which is captured by said image capturing unit after a predetermined duration has been elapsed from a time of capturing an image used for recognition of the candidate by said first recognition unit, with the template data selected by said template selection unit;

a speed measurement unit which measures speed of the vehicle; and a region estimate unit which estimates a position of a region indicating the subject in an image captured by said image capturing unit after a predetermined duration has been elapsed after a time of capturing an image used for recognition of the candidate by said first recognition unit based on a region indicating the subject recognized by said first recognition unit in an image captured by said image capturing unit, and on the speed, wherein said second recognition unit recognizes the subject by comparing a predetermined range of image centering on a position estimated by said region estimate unit among images captured by said image capturing unit with the template data selected by said template selection unit; and further comprising a steering angle measurement section which measures a steering angle of the vehicle, wherein said region estimate section estimates a position of a region indicating the subject further based on the steering angle.

11. An image recognition system which recognizes a subject, which is moving with respect to an image capturing unit, included in an image captured by the image capturing unit, comprising:

the image capturing unit;

a first recognition unit which recognizes a candidate of the subject included in the image captured by said image capturing unit by comparing the image captured by said image capturing unit with predetermined template data;

a template selection unit which selects the template data to be compared with an image captured by said image capturing unit after a predetermined duration has been elapsed from a time of capturing an image used for recognition of the candidate by said recognition unit;

a second recognition unit which recognizes the subject by comparing the image, which is captured by said image capturing unit after a predetermined duration has been elapsed from a time of capturing an image used for recognition of the candidate by said first recognition unit, with the template data selected by said template selection unit; and a region estimate unit which estimates a speed of the subject moving with respect to said image capturing unit, and estimates a position of a region indicating the subject in an image captured by said image capturing unit after a predetermined duration has been elapsed after a time of capturing an image used for recognition of the candidate by said first recognition unit based on a region indicating the subject recognized by said first recognition unit in an image captured by said image capturing unit, and on the speed, wherein said second recognition unit recognizes the subject by comparing a predetermined range of image centering on a position estimated by said region estimate unit among images captured by said image capturing unit with the template data selected by said template selection unit, wherein said region estimate section further estimates a size of a region indicating the subject in an image captured by said image capturing unit after a predetermined duration has been elapsed after a time of capturing an image used for recognition of the candidate by said first recognition section based on a region indicating the subject recognized by said first recognition unit in an image captured by said image capturing unit, and on the speed, and said second recognition section recognizes the subject by comparing a predetermined range of an image according to a size estimated by said region estimate section centering on a position estimated by said region estimate section among images captured by said image capturing unit with the template data selected by said template selection section.

12. An image recognition method which recognizes a subject, which is moving with respect to an image capturing unit, included in an image captured by the image capturing unit, comprising:

a first image capturing step of capturing an image by the image capturing unit;

a first recognition step of recognizing a candidate of the subject included in the image captured in said first image capturing step by comparing the image captured in said image capturing step with predetermined template data;

a template selection step of selecting the template data to be compared with an image captured by the image capturing unit after a predetermined duration has been elapsed from a time of capturing an image in said first image capturing step;

a second image capturing step of capturing an image by the image capturing unit after a predetermined duration has been elapsed from a time of capturing an image in said first image capturing step;

a second recognition step of recognizing the subject by comparing the image captured in said second image capturing unit with the template data selected in said template selection step; and a step of using a region estimate unit to estimate a speed of the subject moving with respect to said image capturing unit, and to estimate a position of a region indicating the subject in an image captured by said image capturing unit after a predetermined duration has been elapsed after a time of capturing an image used for recognition of the candidate by said first recognition unit based on a region indicating the subject recognized by said first recognition unit in an image captured by said image capturing unit, and on the speed, wherein said second recognition unit recognizes the subject by comparing a predetermined range of image centering on a position estimated by said region estimate unit among images captured by said image capturing unit with the template data selected by said template selection unit, wherein said region estimate section further estimates a size of a region indicating the subject in an image captured by said image capturing unit after a predetermined duration has been elapsed after a time of capturing an image used for recognition of the candidate by said first recognition section based on a region indicating the subject recognized by said first recognition unit in an image captured by said image capturing unit, and on the speed, and said second recognition section recognizes the subject by comparing a predetermined range of an image according to a size estimated by said region estimate section centering on a position estimated by said region estimate section among images captured by said image capturing unit with the template data selected by said template selection section.

13. A computer readable medium having an image recognition program stored thereon, which when executed by a computer causes the computer to act as an image recognition system which recognizes a subject, which is moving with respect to an image capturing unit, included in an image captured by the image capturing unit, comprising:

the image capturing unit;

a first recognition unit which recognizes a candidate of the subject included in the image captured by said image capturing unit by comparing the image captured by said image capturing unit with predetermined template data;

a template selection unit which selects the template data to be compared with an image captured by said image capturing unit after a predetermined duration has been elapsed from a time of capturing an image used for recognition of the candidate by said recognition unit;

a second recognition unit which recognizes the subject by comparing the image, which is captured by said image capturing unit after a predetermined duration has been elapsed from a time of capturing an image used for recognition of the candidate by said first recognition unit, with the template data selected by said template selection unit; and a region estimate unit which estimates a speed of the subject moving with respect to the image capturing unit and which estimates a position of a region indicating the subject in an image captured by said image capturing unit after a predetermined duration has been elapsed after a time of capturing an image used for recognition of the candidate by said first recognition unit based on a region indicating the subject recognized by said first recognition unit in an image captured by said image capturing unit, and on the speed, wherein said second recognition unit recognizes the subject by comparing a predetermined range of image centering on a position estimated by said region estimate unit among images captured by said image capturing unit with the template data selected by said template selection unit, wherein said region estimate section further estimates a size of a region indicating the subject in an image captured by said image capturing unit after a predetermined duration has been elapsed after a time of capturing an image used for recognition of the candidate by said first recognition section based on a region indicating the subject recognized by said first recognition unit in an image captured by said image capturing unit, and on the speed, and said second recognition section recognizes the subject by comparing a predetermined range of an image according to a size estimated by said region estimate section centering on a position estimated by said region estimate section among images captured by said image capturing unit with the template data selected by said template selection section.

* * * * *